UNITED STATES PATENT OFFICE.

ARTHÈME MATIGNON, OF BOURG-LA-REINE, FRANCE, ASSIGNOR TO THE SOCIÉTÉ GENERALE DES NITRURES, OF PARIS, FRANCE.

PROCESS FOR THE SYNTHETIC PREPARATION OF AMMONIA FROM ITS CONSTITUENTS.

1,089,240.  Specification of Letters Patent.  Patented Mar. 3, 1914.

No Drawing.  Application filed August 7. 1911.  Serial No. 642,825.

*To all whom it may concern:*

Be it known that I, ARTHÈME MATIGNON, of 7 Boulevard Carnot, Bourg-la-Reine, Seine, France, and a citizen of the Republic of France, have invented a certain new and useful Process for the Synthetic Preparation of Ammonia from Its Constituents, of which the following is a full, clear, and exact description.

This invention relates to the synthetic preparation of ammonia from its constituent elements.

It is known that certain metals possess the property of facilitating the reaction of nitrogen upon hydrogen in order to produce ammonia.

It is of great importance to find catalytic agents working at low temperature.

I have discovered that zinc begins toward 200 degrees to facilitate the combination of the two elements; it works fairly regularly and produces small quantities of ammonia at temperatures below its melting point. I prefer to employ it in a form presenting a large surface, for example, in the form of zinc powder spread upon the surface of a support capable of being traversed by the gases, as for example, asbestos.

The reaction may be conducted either under ordinary pressure, or under increased pressure which favors the reaction. The zinc may be replaced by alloys of this metal sufficiently finely divided to present a large surface.

By way of example, I may pass slowly a mixture of about three parts by volume of hydrogen and one part by volume of nitrogen over finely divided zinc at a pressure of twenty-five to fifty atmospheres and at a temperature of about three hundred degrees. The mixture of nitrogen and hydrogen employed need not necessarily be taken in the proportion of one volume of nitrogen to three of hydrogen.

I am aware that it has been proposed to produce ammonia by causing aqueous vapor to act upon an alloy of an oxidizable metal such as zinc with one of the triad or pental elements to produce hydrogen which in its nascent state is combined with nitrogen. In my process, there is no chemical reaction of the zinc with aqueous vapor or anything else; the hydrogen is in a free and molecular state, and the zinc simply acts as a catalyzer for the formation of ammonia from the mixture of nitrogen and hydrogen gases.

Having thus described my invention, what I claim as such and desire to secure by Letters Patent is:

1. A process for the synthetic formation of ammonia, consisting in passing a mixture of nitrogen and hydrogen gases in free and molecular state over a catalytic agent, containing zinc, at a temperature above normal temperature but below the melting point of said zinc, substantially as described.

2. A process for the synthetic formation of ammonia comprising the passing of a mixture of nitrogen and hydrogen gases over a catalytic agent, said agent consisting of finely divided zinc maintained at a temperature above normal temperature but below the melting point of said zinc.

3. A process for the synthetic formation of ammonia, comprising the passing of a mixture of nitrogen and hydrogen gases under pressure over a catalytic agent consisting of finely divided zinc powder spread upon asbestos and maintained at a temperature above normal temperature but below the melting point of said zinc.

In testimony whereof I have signed my name to this specification, in the presence of two subscribing witnesses.

ARTHÈME MATIGNON.

Witnesses:
CHARLES DONZ,
LEON PEILLET.